United States Patent
Spinnell et al.

(10) Patent No.: US 8,732,006 B2
(45) Date of Patent: May 20, 2014

(54) TRACKING RESPONSE TO ADVERTISEMENTS

(75) Inventors: Spencer Spinnell, New York, NY (US); Nicolae Crucian, New York, NY (US); Ryan Dunn, Brooklyn, NY (US); Smita Hashim, Saratoga, CA (US); Isaac Taylor, New York, NY (US)

(73) Assignee: Google Inc., Mountain View, CA (US)

( * ) Notice: Subject to any disclaimer, the term of this patent is extended or adjusted under 35 U.S.C. 154(b) by 529 days.

(21) Appl. No.: 12/271,639

(22) Filed: Nov. 14, 2008

(65) Prior Publication Data

US 2009/0157511 A1    Jun. 18, 2009

Related U.S. Application Data

(60) Provisional application No. 60/988,702, filed on Nov. 16, 2007.

(51) Int. Cl.
  *G06Q 30/00* (2012.01)
  *G06Q 90/00* (2006.01)

(52) U.S. Cl.
  CPC ........................... *G06Q 90/00* (2013.01)
  USPC ........................................................ 705/14.1

(58) Field of Classification Search
  CPC ........................................................ G06Q 90/00
  USPC ........................................................ 705/14.1
  See application file for complete search history.

(56) References Cited

U.S. PATENT DOCUMENTS

| | | | |
|---|---|---|---|
| 2003/0014312 A1* | 1/2003 | Fleisher | 705/14 |
| 2004/0044576 A1 | 3/2004 | Kurihara et al. | |
| 2005/0171838 A1* | 8/2005 | Eglinton | 705/14 |
| 2005/0171863 A1* | 8/2005 | Hagen | 705/26 |
| 2006/0004628 A1 | 1/2006 | Axe et al. | |
| 2007/0226056 A1 | 9/2007 | Belanger et al. | |

FOREIGN PATENT DOCUMENTS

| | | |
|---|---|---|
| JP | 2001-250052 | 9/2001 |
| JP | 2002-111909 | 4/2002 |
| JP | 2002-123517 | 4/2002 |
| JP | 2003-517166 | 5/2003 |
| JP | 2003-233705 | 8/2003 |
| JP | 2004-046715 | 2/2004 |
| JP | 2004-171105 | 6/2004 |
| JP | 2007-156930 | 6/2007 |

OTHER PUBLICATIONS

International Search Report and Written Opinion of the International Searching Authority, PCT Application Serial No. PCT/US2008/083652, Jun. 24, 2009, 11 pp.

(Continued)

*Primary Examiner* — Daniel Lastra
(74) *Attorney, Agent, or Firm* — Fish & Richardson P.C.

(57) ABSTRACT

Custom ad content and ad contact information are identified, for example, received from an advertiser. Input is received selecting to include at least a portion of the ad contact information as unified ad contact information within a print ad including the custom ad content. Further input is received selecting to activate one or more tracking mechanisms associated with the portion of ad contact information. The print ad including the custom ad content and the portion of ad contact information is provided to a publisher. An effectiveness of the ad contact information included in the portion is tracked. The effectiveness of the print ad is reported.

28 Claims, 6 Drawing Sheets

(56) References Cited

OTHER PUBLICATIONS

"Ad Words" Wikipedia, the Free Encyclopedia [online] Nov. 25, 2007 <URL: http://en.wikipedia.org./wiki/Adwords> [retrieved Mar. 22, 2009], 6 pp.

Cho, Michael et al. "Search-based Online Advertising" [online] Oct. 2005. <URL: http://people.ischool.berkeley.edu/~hal/Couses/Strat-Tech09/Tech/Tech05/C-report.doc>, [retrieved on Mar. 25, 2009], 11 pp.

"Google Analytics" Wikipedia, the Free Encyclopedia [online] Oct. 12, 2007 <URL: http://en.wikipedia.org/wiki/Google_analytics>, [retrieved on Mar. 22, 2009], 3 pp.

"Reverse Auction" Wikipedia, the Free Encyclopedia [online] Nov. 16, 2006 <URL: http://en.wikipedia.org/wiki/reverse_auction> [retrieved Mar. 22, 2009], 4 pp.

Authorized officer Yoshiko Kuwahara, International Preliminary Report on Patentability in PCT/US2008/083652, mailed May 27, 2010, 6 pages.

\* cited by examiner

TRACKING RESPONSE TO ADVERTISEMENTS

CROSS-REFERENCE TO RELATED APPLICATION

This application claims priority to U.S. Provisional Application Ser. No. 60/988,702, entitled Tracking Response to Advertisements, filed on Nov. 16, 2007, the entire contents of which are incorporated herein by reference.

TECHNICAL FIELD

This invention relates to information gathering.

BACKGROUND

An advertiser may select to place an advertisement in several printed publications (hereinafter a "print ad"). Although the advertiser may receive increased business or inquiries in response to the print ads placed, generally the advertiser does not know whether certain of the print ads were more effective than others. In another scenario, the advertiser may place the print ad in one publication but on several dates. Again, generally the advertiser does not know whether placing the print ad on certain dates or days of the week is more effective than other dates or days of the week.

SUMMARY

In general, in one aspect, the invention features processes, computer program products and systems for receiving custom ad content and receiving ad contact information. Custom ad content and ad contact information are identified, for example, received from an advertiser. Input is received selecting to include at least a portion of the ad contact information as unified ad contact information within a print ad including the custom ad content. Further input is received selecting to activate one or more tracking mechanisms associated with the portion of ad contact information. The print ad including the custom ad content and the portion of ad contact information is provided to a publisher. An effectiveness of the ad contact information included in the portion is tracked. The effectiveness of the print ad is reported.

Implementations of the invention can include none or some of the following advantages. An advertiser can track the effectiveness of an advertisement, e.g., a print ad. The effectiveness can be tracked for different items of ad contact information included within the ad. The effectiveness can be individually tracked for the ad published by multiple publishers. The effectiveness can be individually tracked for the ad published on multiple dates and/or on multiple days of the week. The effectiveness of an ad can be enhanced by providing unified ad contact information, particularly if the unified ad contact information is consistently provided in a similar visual manner that can be easily recognizable upon viewing or listening to the ad. Consistent, unified ad contact information can also help to set viewer expectations on finding contact information within an ad, and can improve the probability of a viewer noticing, remembering and responding to the contact information.

Including the unified ad contact information in a separate portion of the print ad, e.g., in a footer, separates the artistic aspects of advertising (i.e., found in the custom ad content) where creativity and aesthetic design can increase viewer attention and appeal, from the functional prerequisites for viewer response and measures of ad effectiveness. This can allow each component of the ad to be optimized, which can create a more effective ad than if the components are commingled as in a conventional ad.

In an implementation where an advertising system manager provides a template for an advertiser to create an ad, and where the advertising system manager automatically generates the unified ad contact information portion of the ad, e.g., a standard footer, and provides tracking services, the costs of ad design and production can be reduced. The need for complex graphic design services can be reduced, and customized but like ads can be placed across multiple publishers efficiently and cost-effectively.

The collection and compression of multiple viewer-response metrics (viz., URL, toll-free number, SMS, etc.) and promotional metadata (viz., product, price, location and timestamp, e.g., embedded in a 2-d barcode) facilitates immersive, multimedia interactions with consumers, allowing heterogeneous demographics to react to ads via their preferred methods. The metadata can be both more comprehensive and more easily stored and retrieved, for example, in databases, facilitating standardized analyses and optimization of promotional relevance and efficiency over time, with benefits to all parties, i.e., advertisers, publishers, viewers and consumers. The aggregation of multiple ads with similar, standardized response-tracking components (e.g., footers) can create an economy of density and multiplicative benefits for both marketer and consumer groups.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Techniques, methods, apparatus and a system for content distribution are described that can be used to facilitate, for example, advertising, including print advertising. Print advertising is advertising occurring in print for example, in newspapers, magazines, journals, periodicals, flyers, brochures, and other printed publications. While reference is made herein to placing advertisements, the systems, methods, apparatus and techniques disclosed can be used with other forms of content including other forms of sponsored content. By way of example, an advertisement system is described. An advertisement placed in a printed publication shall be referred to herein as a "print ad".

An advertiser that places a print ad in more than one publication may desire to learn the effectiveness of the placement in a particular publication. That is, although the advertiser's business or rate of inquiries may increase after placement of the print ad, the advertiser may desire to learn whether placement in one publication was more effective than another, for example. Further, if the advertiser included more than one means to contact the advertiser within the print ad, e.g., a telephone number and a web address, the advertiser may desire to learn which means of contacting the advertiser was most used in response to the print ad. If the advertiser places the print ad to run on multiple days of the week and/or on multiple dates, the advertiser may desire to learn which days of the week or dates were more effective.

Figure 1:
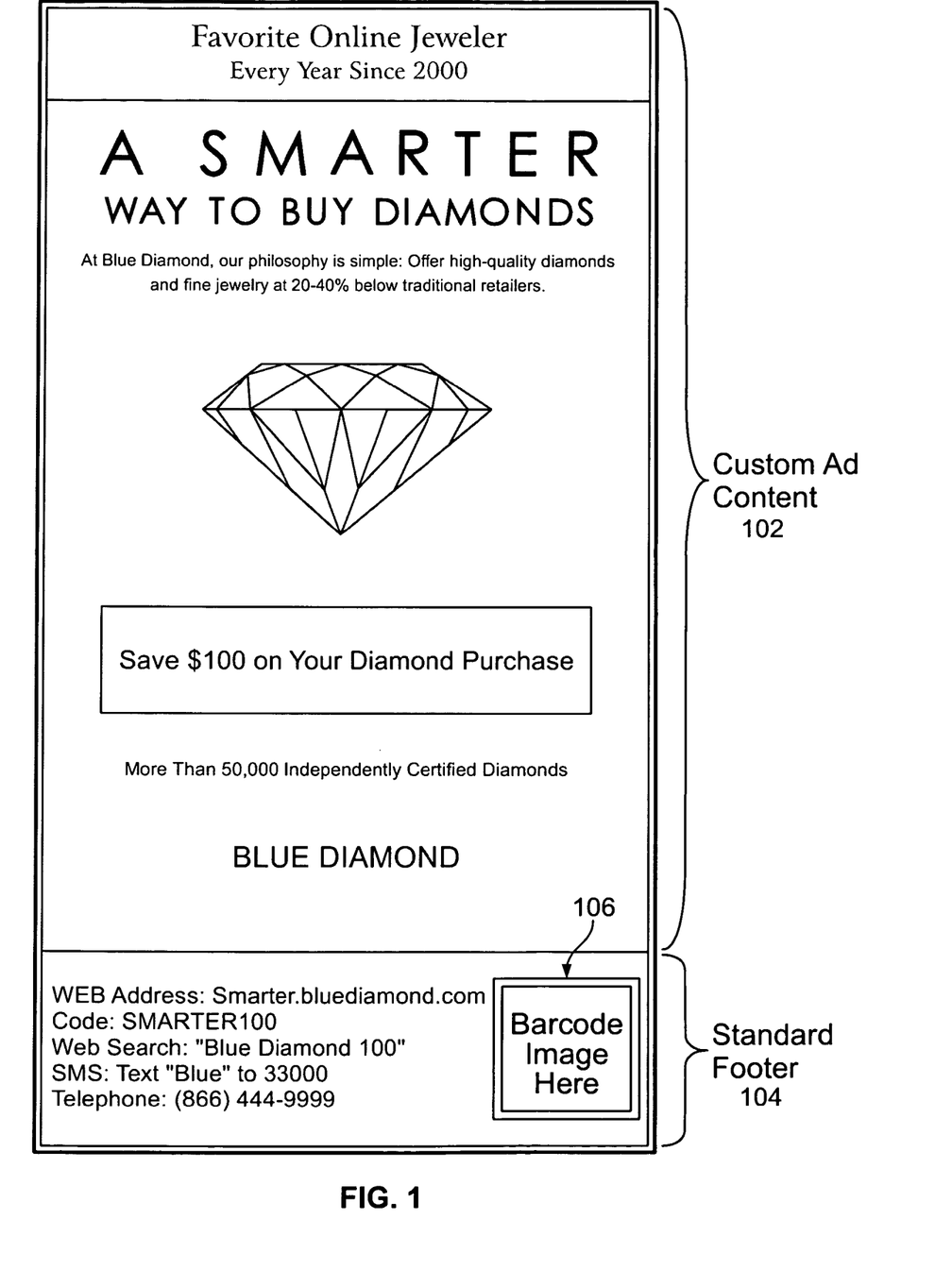
FIG. 1 is an example print ad including advertiser contact information.

Referring to FIG. 1, an example print ad 100 is shown. The print ad 100 includes custom ad content 102 and a footer 104 including unified ad contact information. The unified ad contact information includes various ways for a viewer of the print ad to find out more information about the advertiser and/or product being advertised (the "ad contact information"). In the particular implementation shown, the unified ad contact information is included in a footer 104, however, in other implementations the unified ad contact information can be located elsewhere relative to the custom ad content 102, for example, as a header or along a side of the custom ad content 102. In the example print ad 100 shown, the ad contact information includes a web address, a code (e.g., a coupon code), web search terms, SMS information and a telephone number. With the exception of the code, the ad contact information can be used to find out information about the advertiser, e.g., Blue Diamond. The code can be used, for example, to receive a discount on a purchase from an advertiser (e.g., Blue Diamond), as shall be described further below.

Providing the ad contact information in a unified, identifiable location within the print ad 100 can facilitate viewer response to the print ad 100. For example, if the footer format is consistently used to provide the unified ad contact information in various different print ads placed in various different publications, the footer 104 can become an instantly recognizable source of ad contact information for a viewer. If the custom ad content 102 attracts the viewer's attention, he or she can be instantly drawn to the footer 104 to obtain the ad contact information of his or her preference.

The ad contact information, and how it may be used to track the effectiveness of the print ad 100, shall be described further below. However, for the purpose of putting this example print ad 100 into context, one example electronic print ad management system that can be used to implement the techniques, computer program products and systems disclosed herein shall be described. It should be understood however that the techniques, computer program products and systems can be implemented in other systems, and the system described is but one illustrative example.

Figure 2:
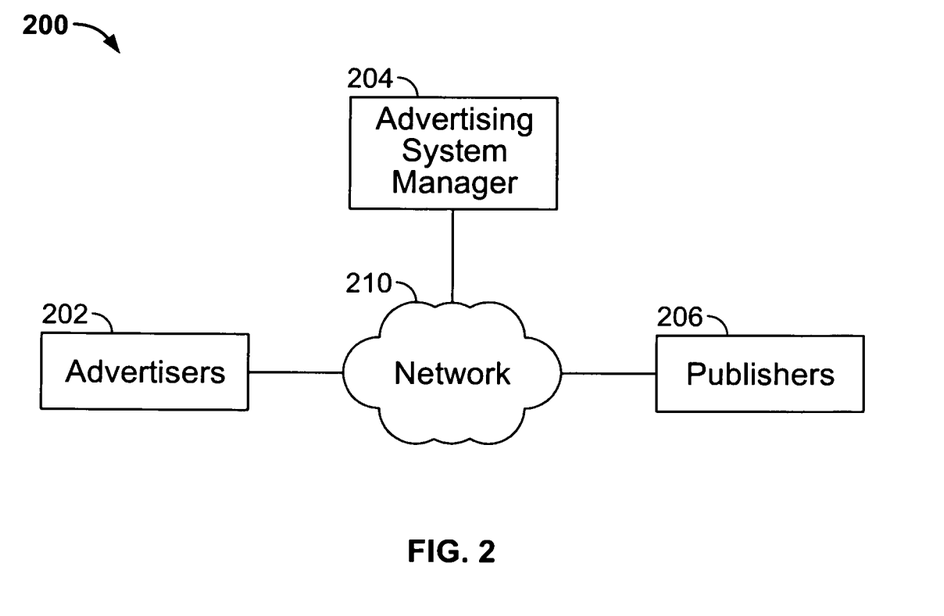
FIG. 2 is a block diagram of an example electronic print ad management system.

FIG. 2 is a block diagram of an example electronic print ad management system 200. The system 200 includes advertisers 202 and publishers 206. A publisher 206 is an entity that publishes content (e.g., print ads) or places content (e.g., print ads) for publication with another entity. By way of example, reference is made to placing print ads in a publication. Other forms of content can be delivered and published in other forms of media in accordance with the methods, apparatus and systems disclosed herein. An advertiser 204 is an entity that desires to place content in a media (e.g., a print ad in a printed publication). The advertiser 204 can be a direct supplier (e.g., an advertising entity) or an indirect supplier (e.g., a broker) of the print ad.

The system further includes an advertising system manager 204. The advertising system manager 204 operates to bring the advertisers 202 and publishers 206 together by way, for example, of an online print ad marketplace, as is described further below. A computer network 210, such as a local area network (LAN), wide area network (WAN), the Internet, or a combination thereof, connects the advertisers 202, the advertising system manager 204 and the publishers 206.

Figure 3:
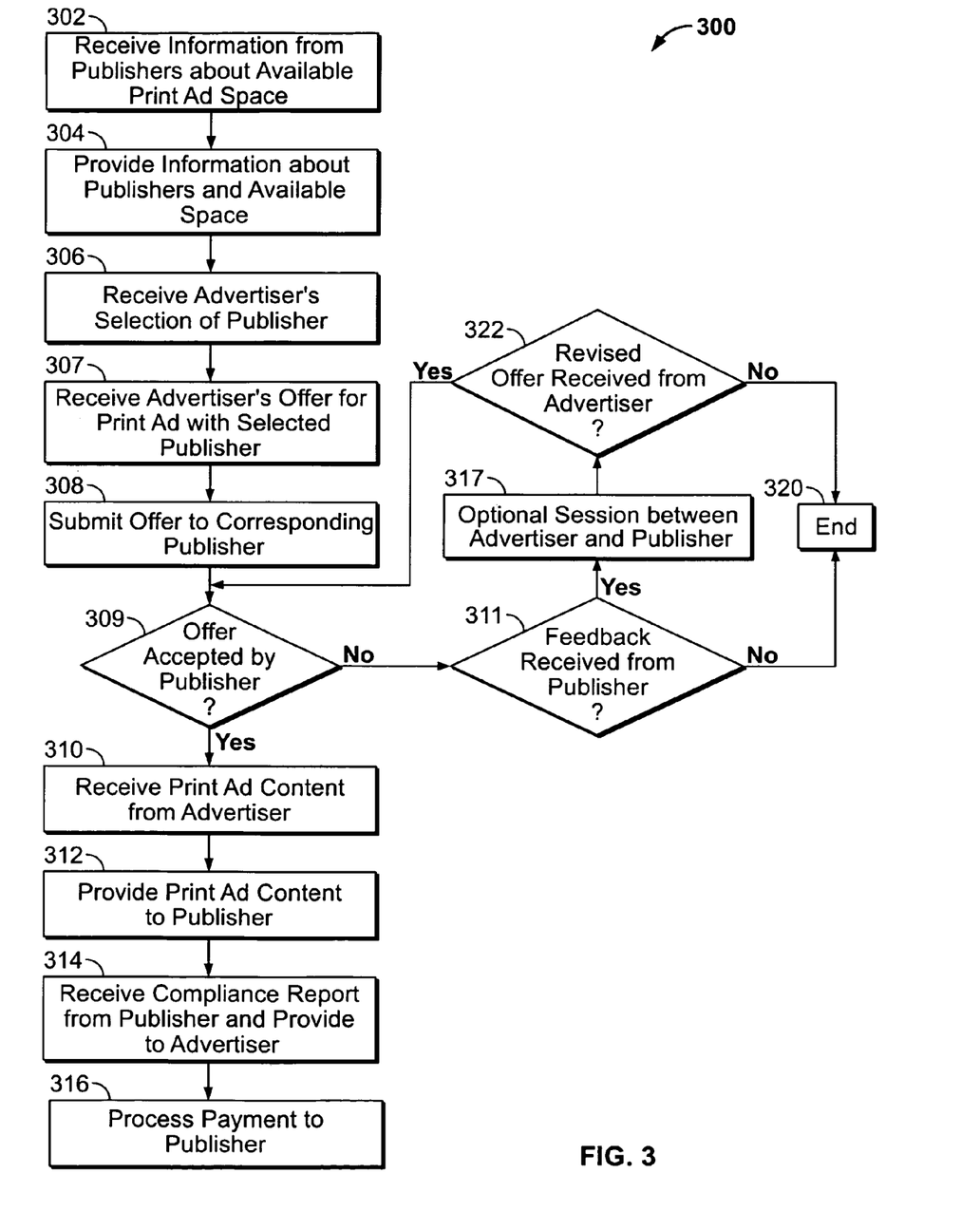
FIG. 3 is a flowchart showing an example process for providing an electronic advertising system.

FIG. 3 is a flowchart showing an example process 300 implemented by, for example, the electronic advertising system 200 (e.g., an online marketplace) for publishers 206 and advertisers 204, wherein one or more of the steps in the process can be carried out by, for example, the advertising system manager 204. Available print ad space is identified (step 302). For example, the publishers 206 can provide information to the advertising system manager 204 about available print ad space. The publisher information can include the name of the publication, the date or dates the publication is published, the location of the print ad space within the publication, the size and layout of the print ad space, whether the print ad will be run in black and white, color or either, and/or other information the publisher desires to provide to market their available print ad space.

Information associated with the publishers of the available print ad space is provided to advertisers (Step 304). For example, the advertising system manager 204 can provide an online marketplace in which publisher information provided by the publishers 206 is made available to the advertisers 202. In one implementation, the online marketplace is a web site. In this implementation, an advertiser 202 can be presented with a graphical user interface (GUI) through which the advertiser 202 can input certain choices about publishers with whom they would like to place ads. For example, the GUI can include checkboxes, drop-down menus, radio controls, data entry fields, and/or other user input controls or combinations thereof. In one implementation, the web site includes search capabilities. For example, if an advertiser 202 would like to search for a newspaper in a particular geographic location, the advertiser 202 can use the search capabilities to identify one or more newspapers meeting the advertiser's 202 geographic criteria, although a search query can be based on different and/or other search criteria as well.

An advertiser selects one or more publishers that the advertiser is interested in placing a print ad with (step 306). For example, using the web site provided by the advertising system manager 204, the advertiser 202 can provide input to the advertising system manager to choose one or more publishers 206 that the advertiser 202 is interested in placing ads with based on publisher information included on the web site. By way of illustrative example, consider an advertiser 202 that is interested in placing a print ad in a newspaper. In this example the publishers 206 are newspapers. The advertiser 202 can choose certain newspaper publishers 206, for example, based on factors such as geography, circulation size, ad size availability, section availability and other criteria. To the extent that a publisher 206 has provided publisher information relevant to these factors to the advertising system manager 204, the advertiser 202 has access to this information, through the advertising system manager 204, when choosing the newspaper publishers 206.

The advertiser creates an offer for one or more print ads with the selected publishers (step 307) and can submit the offer to the advertising system manager. The offer can include the specific terms associated with the advertisement including the price that the advertiser is willing to pay for placing the ad. For example, the advertiser 202 can select various parameters related to the desired advertising, such as the day(s)-of-week, desired newspaper section and ad size for each chosen newspaper publisher 206. The advertiser 202 can input a "bid amount" (e.g., a price the advertiser 202 is willing to pay to place an ad of the selected ad size in the chosen newspaper section on the selected day or days of the week). The advertiser's input, including the bid amount, can constitute the advertiser's "offer".

In step 308, offers are submitted to corresponding publishers. For example, the advertising system manager 204 can submit the advertiser's offers to the corresponding publishers 206. In some implementations, submitting the offers can include sending an electronic message to the publishers that includes information about the offers. In some implementations, submitting the offers can include making the information about the offers available on a portion of a web site maintained by the advertising system manager 204, which may be accessible only to appropriate publishers. In some implementations, submitting the offers can include making the offers available on a particular portion of the web site and notifying the appropriate publishers of the availability of the offers by electronic message. Each publisher 206 can respond by either accepting or declining the offer. In one implementation, a publisher 206 can decline an offer but initiate an online (or offline) dialog with the advertiser 202 as to why the offer was not accepted and the two parties can attempt to reach an agreement satisfactory to both parties.

If an offer is accepted ("Yes" branch of decision step 309), the print ad content can be submitted (step 310). For example, the advertiser 202 can electronically submit corresponding print ad content to the publisher 206. Alternatively, the advertiser can supply print ad content with the offer. In one implementation, the advertiser 202 uploads an electronic file including the print ad content to the advertising system manager 204 and the advertising system manager 204 provides the electronic file to the publisher 206 (step 312).

If an offer is declined ("No" branch of decision step 309), a check can be made to determine if publisher feedback has been received (step 311). If so ("Yes" branch of decision step 311), an optional session between the advertiser and publisher can be initiated (step 316), during which, for example, the advertiser and publisher can continue negotiating terms associated with an ad placement. If no publisher feedback has been received ("No" branch of decision step 311), the process 300 can terminate (step 320). For example, if the publisher provides no comments or feedback to the advertiser 202 as to why the offer was declined, then the process terminates. However, if the publisher 206 does provide feedback to the advertiser 202, the advertiser 202 may be motivated to provide a revised offer ("Yes" branch of decision step 322), and the process returns to decision step 308. Otherwise, if the advertiser 202 does not provide a revised offer ("No" branch of decision step 322), the process terminates (Step 320).

Step 314 includes submission of a compliance report (e.g., an electronic tearsheet). For example, once the publisher 206 has run the ad (e.g., run the ad in the desired section in the newspaper on the selected date), the publisher 206 can provide proof that the ad ran to the advertising system manager 204. In one implementation, an electronic tearsheet can be uploaded to the electronic advertising system as proof that the ad ran according to agreed-upon terms. The electronic tearsheet can be an electronic file that includes an image of the ad as placed within the publication and can include enough information to show that the ad ran in the desired section of the newspaper on the selected date and according to any other specifications of the advertiser, e.g., ad size, ad color, font size, etc. In one implementation, the electronic tearsheet is a PDF file including a scanned representation of the page of the publication on which the ad ran.

Once an electronic tearsheet is uploaded by the publisher 206 to the advertising system manager 204, the advertising system manager 204 can provide the electronic tearsheet to the advertiser 202. For example, the advertising system manager 204 can forward the electronic tearsheet to the publisher by electronic message, by making the electronic tearsheet accessible in a portion of a web site to which the publisher has access, through a combination of providing access and sending an electronic messages, etc.

Once the advertising system manager 204 determines that the ad ran (e.g., by receiving an electronic tearsheet), settlement can be effectuated (e.g., the advertising system manager 204 can collect a bid amount from the advertiser 202 and transmit a publisher's share of the collected bid amount to the publisher) 206 (Step 316).

In some implementations, the advertising system manager 204 automates many if not all steps in the process of either placing ads (e.g., steps taken by an advertiser 202) or selling ad space (e.g., steps taken by a publisher 206). For example, the advertising system manager 204 can automatically provide matches between advertisers 202 and publishers 206 based on their respective inputs (e.g., the advertisers' offers and the publishers' information). Further, the advertisers 202 can be provided with an electronic mechanism for uploading and transmitting the ad content to the publishers 206. The publishers 206 can be provided with an electronic mechanism for proving the ad was placed as agreed (e.g., in the form of an electronic tearsheet). Once both parties are satisfied their terms of the agreement (subject in some implementations to mediation by the advertising system manager 204), payment (e.g., the bid amount) can be automatically collected from the advertiser 202 and the publisher can be provided with the publisher's share of the bid amount.

Advantageously, the advertiser 202 can be provided with a central mechanism (e.g., the advertising system manager's website) to access available print ad space of, for example, multiple publishers. Correspondingly, the publishers 206 can be provided with a marketplace for their available print ad space. The payment mechanism (e.g., a bid system) can enable the advertiser 202 to only pay what the advertiser 202 decides to pay, and the publisher 206 can choose to accept only offers that are most desirous to the publisher 206.

Referring again to FIGS. 1 and 2, in one implementation, the advertising system manager 204 can provide one or more GUI's to an advertiser 202 wherein an advertiser can input the ad contact information the advertiser would like included in the unified ad contact information, e.g., the footer 104. That is, the advertiser can input their web address, a telephone number, etc. In one implementation, the advertising system manager 204 can then automatically populate a standard form of unified ad contact information, e.g., the footer 104, with the ad contact information. The ad contact information can include some or all of the examples shown in the footer 104, and/or can include different forms of contact information.

One or more of the items included within the footer 104 can be used to track responses to the print ad 100. Illustrative examples of the tracking mechanisms are described below, although it should be understood that other forms of tracking mechanisms can be used.

In one implementation, when placing the print ad 100, the advertiser 202 can select to activate some or all of the tracking mechanisms that can be associated with the different items included in the footer 104. The advertising system manager 204 can then manage the tracking data collected from the one or more tracking mechanisms and provide the tracking data to the advertiser 202, for example, by providing an online tracking report available to the advertiser 202 either periodically and/or on demand.

If the footer 104 includes a web address, increased traffic to the web address can be tracked and can be attributed at least in part to the effectiveness of the print ad 100. One mechanism for tracking web traffic is the Google Analytics service provided by Google Inc. of Mountain View, Calif. In one implementation, the web address can be for a particular web page created specifically for the print ad 100. Accordingly, any traffic to the web page can be attributed to the effectiveness of the print ad 100, as the only way for a web user to know the URL to take the web-user to the particular web page is from the print ad 100, either directly (i.e., by viewing the print ad) or indirectly (i.e., by learning about the URL from someone lese that viewed the print ad). In some implementations, if the advertiser 104 would like to track the effectiveness of publishing the print ad 100 on particular dates or days of the week, the advertiser 104 can include a different URL within the print ad 100 for the particular dates or days of the week. The advertiser 104 can then compare the traffic to the web page included in the print ad 100 on a particular date or day or the week to the traffic to the different web page included in the print ad 100 on another date or day of the week. Similarly, if the advertiser 104 is placing the print ad 100 in more than one publication, the advertiser 104 can include a different web addresses in the print ad 100 placed in each publication, and therefore track the effectiveness of the print ad 100 individually for each publication.

If the footer includes a code, a viewer of the print ad 100 can use the code, for example, when making a purchase from the advertiser 202. If the code is only provided by way of the print ad 100, then each use of the code by a customer of the advertiser 202 can be attributed to the effectiveness of the print ad 100. In one implementation, a different code can be included in the print ad 100 placed in different publications and/or on different dates or days of the week, such that the effectiveness of a print ad 100 within a particular publication and/or on a particular date or day can be tracked. In one implementation, where the advertising system manager is Google, Inc. and the advertiser 202 uses the Google Checkout service offered by Google, Inc., the advertising system manager (i.e., Google, Inc.) can track the use of the code.

If the footer includes web search terms, for example the search terms "Blue Diamond 100" shown in the example footer 104, then increased traffic to the advertiser's web site by way of the search terms can be tracked. For example, if the advertising system manager is Google, Inc. and the advertiser 202 uses the Google AdWords service offered by Google, Inc., then the advertising system manager (i.e., Google, Inc.) can track the increased use of the search terms through the Google AdWords tracking capabilities, and attribute at lease some of the increased use to the print ad 100.

If the footer includes SMS information, text messages corresponding to the text word included in the footer 104, e.g., "Blue" to the SMS number provided, e.g., 33000, can be tracked. If the SMS information is only provided by way of the print ad 100, then any such text messages received can be attributed to the effectiveness of the print ad 100. In one implementation, the advertiser 202 can include a different text word and/or SMS number within the print ad 100 placed in particular publications and/or on particular days or dates of publication. Accordingly, the effectiveness of the print ad 100 as placed in the particular publications or on the particular dates or days can be tracked individually. In one implementation, the advertising system manager 202 can track the text messages to the SMS number(s) provided, and in other implementations the advertiser 202 or a third party can track this data.

If the footer includes a telephone number, then calls to the number in response to the ad can be tracked. If the telephone number is only provided by way of this print ad, for example, a toll-free number that is forwarded to the advertiser's regular telephone number, then all calls to the toll-free number can be attributed to the effectiveness of the print ad 100. In one implementation, the advertiser 202 can include different telephone numbers within the print ad 100 placed in particular publications and/or on particular days or dates of publication. Accordingly, the effectiveness of the print ad 100 as placed in the particular publications or on the particular dates or days can be tracked individually. In one implementation, the advertising system manager 202 can provide the toll-free telephone number and track calls to the number(s). In other implementations the advertiser 202 or a third party can manage the call-tracking.

If the footer includes a barcode, for example if a barcode is located at the position 106 shown in the footer 104, then a viewer of the print ad 100 can read the barcode with an appropriate barcode reader. For example, a handheld electronic device such as a mobile telephone or a digital camera may include a barcode reader adapted to read the barcode 106. The barcode reader can then provide ad contact information as encoded within the barcode, for example, a telephone number or web address. Advantageously, the viewer can store the retrieved information on his or her electronic device and therefore not require a pen and paper, for example, to write down the ad contact information. In another implementation, if the ad contact information retrieved from the barcode 106 includes a web address, a web browser application within the electronic device used to read the barcode 106 can be launched and a web page corresponding to the web address automatically displayed. In one implementation, the barcode is a horizontal or vertical barcode. In another implementation, the barcode is a two-dimensional barcode, for example, a QR (quick response) code. The ad contact information retrieved from the barcode can be tracked using the tracking mechanisms discussed above, e.g., call-tracking for a telephone number, or other tracking techniques depending on the information provided.

By tracking several contact metrics as discussed above, the advertiser 202 can better assess how a print ad viewer responds to the print ad. The advertiser 202 can use that information to iterate and/or improve their print ad concepts, designs, offers, and placements (e.g., publications and/or the dates or days of the week within which to place a print ad), for their intended audience.

Figure 4:
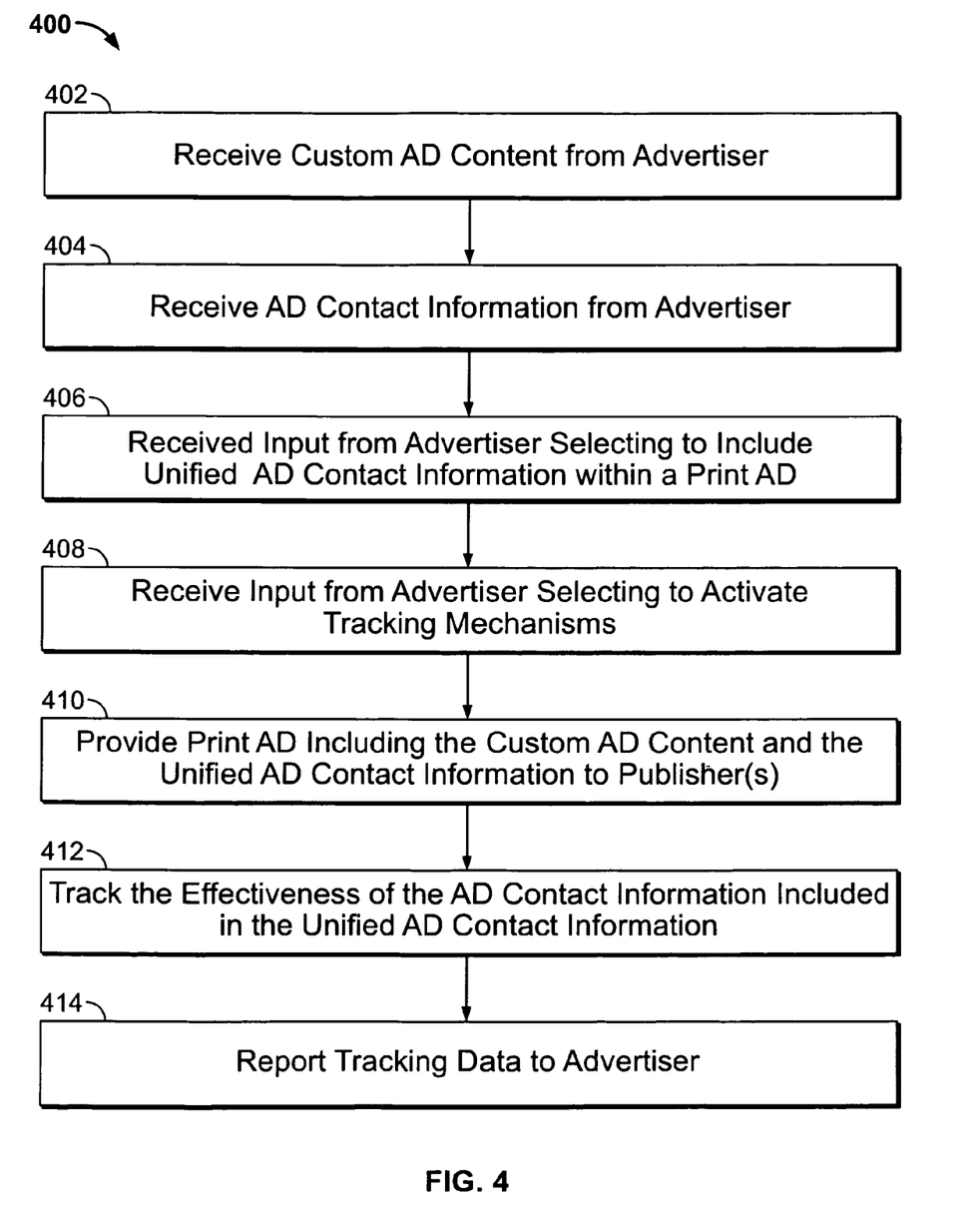
FIG. 4 is a flowchart showing an example process for providing unified ad contact information and tracking the effectiveness of the same.

Referring now to FIG. 4, a flowchart illustrates an example process 400 for including ad contact information and tracking responses to the same within a print ad. The example process 400 is directed to the steps taken by, for example, an advertising system manager operating as a conduit between an advertiser and a publisher. For example, the advertising system manager can be the advertising system manager 204 shown in the system 200 in FIG. 2, facilitating ad placement for the advertiser 202 with one or more publishers 206. However, it should be understood that the process 400 can be implemented by other systems including other advertising system managers within a differently configured system.

Custom ad content is received/identified (step 402) along with ad contact information (step 404). In some implementations, the ad contact information is received at the same time as the custom ad content. In other implementations, for example if the advertiser has an account with the advertising system manager, the ad contact information is received prior to the custom ad content and can be retrieved by the advertising system manager, for example, from a data store.

Input is received for including unified ad contact information within the ad (e.g., a print ad) that includes the custom ad content (step 406). For example, in one implementation, the advertiser can receive a prompt asking if the advertiser would like to include a "Standard Footer" within the print ad, where the standard footer includes the unified ad contact information. The advertiser can check a checkbox or activate a radio box, or any other such control, to respond positively. The advertiser can then be prompted to select the particular type of ad contact information to include, e.g, web address, telephone number, etc., or a default set of ad contact information can be used, where the default selections are made either by the advertiser at an earlier point in time, or by the advertising system manager. As already discussed, the unified ad contact information can be included as a footer, but can also take a different format, such as a header or otherwise.

Input is received selecting to activate tracking mechanisms to track some or all of the ad contact information included in the unified ad contact information (step 408).

Thereafter a print ad including both the custom ad content and the unified ad contact information is provided (e.g., to one or more publishers) for publication (step 410). If the advertising system manager is a publisher, then the advertising system manager publishes the print ad. Thereafter tracking of ad effectiveness using the ad contact information included in the unified ad contact information is provided (step 412). A report of the tracking data can be generated (e.g., and provided to the advertiser) (step 414).

Figure 5:
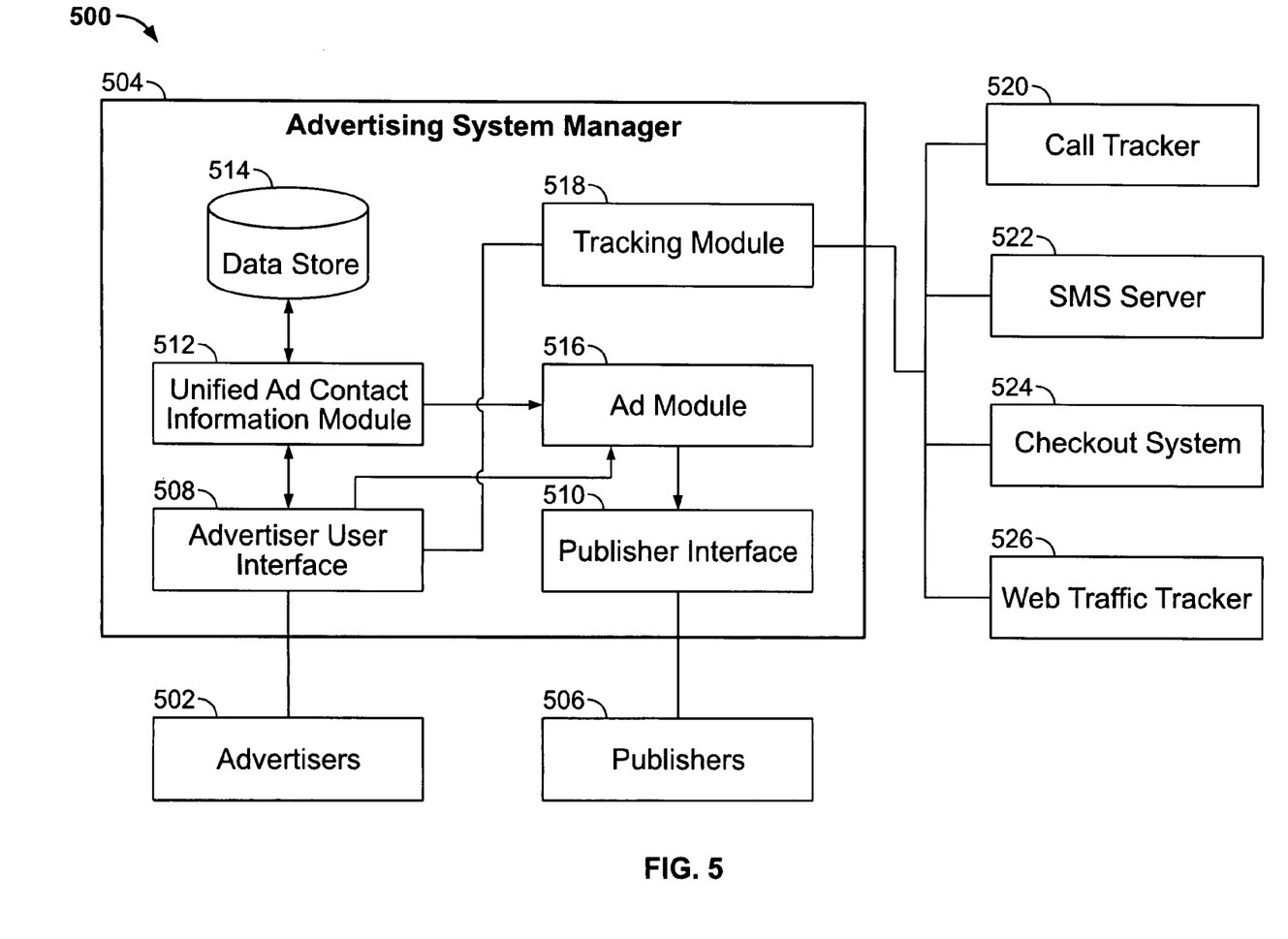
FIG. 5 is a block diagram of an example electronic ad management system including tracking mechanisms.

Referring to FIG. 5, an example system 500 for providing an ad including unified ad contact information and tracking the effectiveness of the same is shown. The system includes an advertising system manager 504 in communication with advertisers 502 and publishers 506, for example, over a network such as a LAN, WAN, the Internet, or other. The advertising system manager 506 interacts with the advertiser 504 through an advertiser user interface 508, for example, provided as a web page through an application executing in a web browser. The advertising system manager 506 interacts with the publishers 506 through a publisher interface 510.

The advertising system manager 504 includes a unified ad contact module. The unified ad contact module 512 is configured to adapt the ad contact information specified by an advertiser (or by the advertising system manager 504) into a unified ad contact information format, for example, the footer 104 shown in FIG. 1. The ad contact information can be obtained from the advertiser 502 through the advertiser user interface 508 and/or can be obtained from a data store 514 including previously collected ad contact information.

The advertising system manager 504 further includes an ad module 516. The ad module 516 is adapted to receive custom ad content from the advertiser 502 through the advertiser user interface 508 and receive the unified ad contact information from the unified ad contact module 512. The ad module 516 is further adapted to provide a print ad including the custom ad content and the unified ad contact information to one or more publishers 506 through the publisher interface 510.

In the implementation shown, the advertising system manager 504 includes a tracking module 518, although in other implementations the tracking module 518 can be external to the advertising system manager 504. The tracking module 518 can communicate with one or more tracking mechanisms to receive tracking data related to the unified ad contact information included in the print ad. For example, in the implementation shown, the tracking module 518 communicates with a call tracker 520, an SMS server 522, a checkout system 524 and a web traffic tracker 526. In the example shown, the tracking mechanisms are external to the advertising system manager 504. In other implementations, some or all of the tracking mechanisms can be included within the advertising system manager 504. Alternatively, the tracking module 518 and the tracking mechanisms can be external to the advertising system manager 504.

The techniques described above for unifying the dissemination of ad contact information and response tracking can be used in contexts other than print ads. For example, a similar format can be used in an audio ad, a video ad, a television ad or an online ad. That is, the ad contact information can be provided in a consistent, unified format and tracking mechanisms can be used to track the effectiveness of the ad. By way of illustrative example, for an audio ad (e.g., a radio ad), the ad contact information can be provided immediately following the custom ad content forming a radio commercial. If a web address or telephone number is provided, as examples, then web traffic tracking and/or call-tracking as described above can be used to track the effectiveness of the radio commercial. Similarly, a text display similar to the footer 104 can be included within a TV commercial or an online ad, and the response to the ad contact information included therein tracked in a similar manner.

The invention and all of the functional operations described in this specification can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Figure 6:
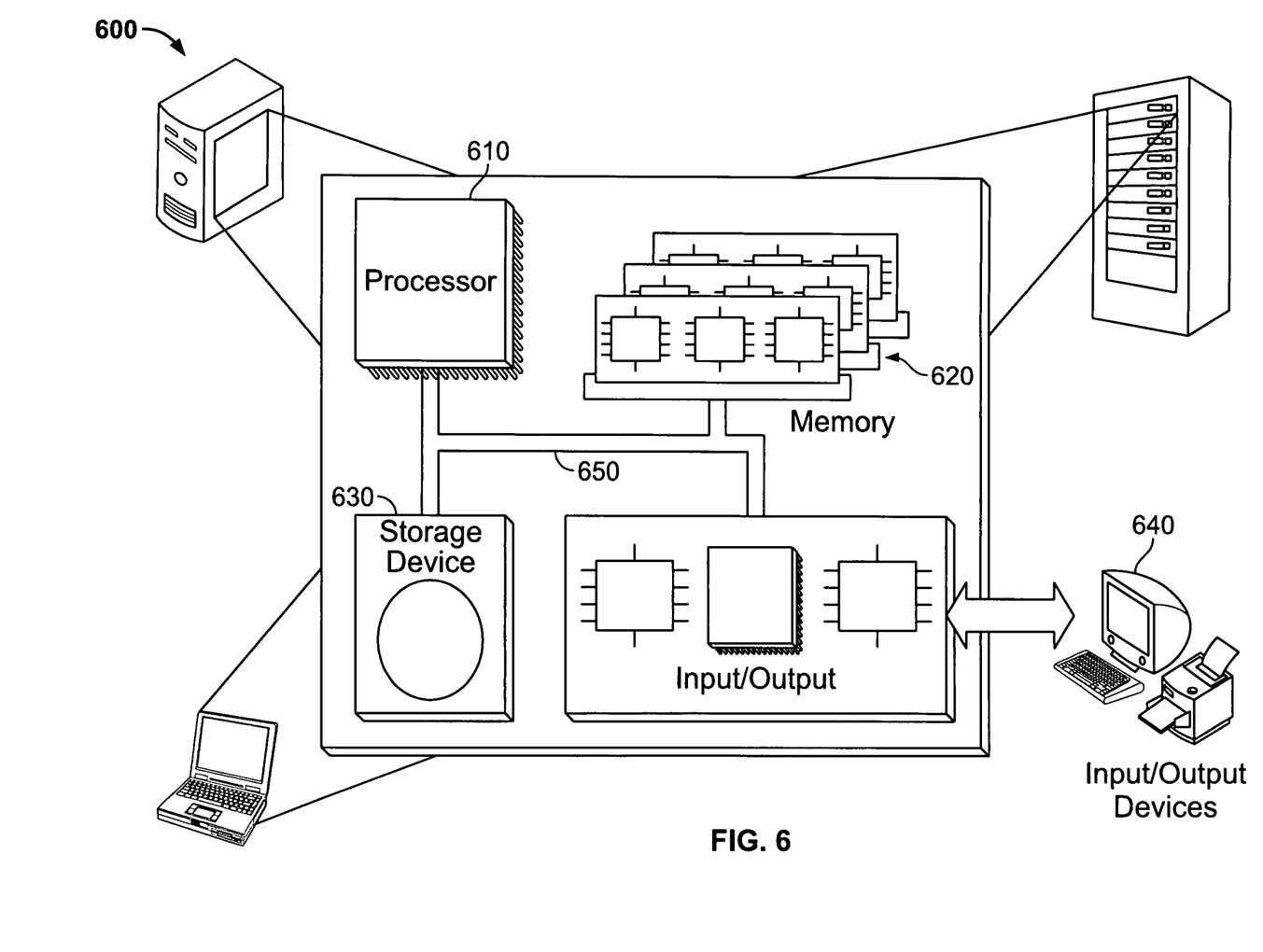
FIG. 6 is a schematic diagram of an example computer system.

Referring now to FIG. 6, a schematic diagram of an example computer system 600 is shown. The system 600 can be used for the operations described in association with the processes 300 and 400 shown in FIGS. 3 and 4, according to one implementation. For example, one or more of the systems 600 can be used to implement a server hosting the advertising system manager 204, the advertisers 202 and/or the publishers 206 (see FIG. 2).

The system 600 includes a processor 610, a memory 620, a storage device 630, and an input/output device 640. Each of the components 610, 620, 630, and 640 can, for example, be interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640. In some embodiments, a parallel processing set of systems 600 connected over a network may be employed, clustered into one or more server centers.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can, for example, include a hard disk device, an optical disk device, or some other large capacity storage device.

The input/output device 640 provides input/output operations for the system 600. In one implementation, the input/output device 640 includes a keyboard and/or pointing device. In another implementation, the input/output device 640 includes a display unit for displaying graphical user interfaces.

A module, as the term is used throughout this application, can be a piece of hardware that encapsulates a function, can be firmware or can be a software application. A module can perform one or more functions, and one piece of hardware, firmware or software can perform the functions of more than one of the modules described herein. Similarly, more than one piece of hardware, firmware and/or software can be used to perform the function of a single module described herein.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a publisher" includes two or more publishers and reference to "an ad" includes a combination of two or more or different types of ads.

A number of implementations have been described. Nevertheless, it will be understood that various modifications may be made without departing from the spirit and scope of the invention. Accordingly, other implementations are within the scope of this application.

What is claimed is:

1. A method comprising:
performing in one or more computers operations comprising:
identifying custom ad content;
identifying ad contact information to be presented along with the custom ad content in a printed publication;
identify a standard form for the ad contact information;
populating the standard form with the identified ad contact information;
combining the populated standard form and the custom ad content to form a print ad for publication;
receiving input selecting to activate a plurality of tracking mechanisms associated with the print ad, each of the plurality of tracking mechanisms configured to track contacts with a sponsor of the print ad that are initiated using a different portion of the identified ad contact information;
providing the print ad to a publisher;
tracking an effectiveness of the print ad based at least in part on the use of plural different parts of the ad contact information including determining a most effective portion of the ad contact information in terms of its propensity to be used to contact the sponsor of the print ad; and
reporting the effectiveness of the print ad including reporting the most effective portion.

2. The method of claim 1, wherein the ad contact information includes a web address, and tracking the effectiveness of the print ad includes tracking web traffic to the web address.

3. The method of claim 1, wherein the ad contact information includes a code, and tracking the effectiveness of the print ad includes tracking use of the code.

4. The method of claim 1, wherein the ad contact information includes a telephone number, and tracking the effectiveness of the print ad includes tracking calls to the telephone number.

5. The method of claim 4, wherein the telephone number is a toll-free number, the method further comprising:
receiving a request to include a toll-free number in the portion; and
in response to the request, selecting a toll-free number to include in the standard form and forwarding calls to the toll-free number to a telephone number associated an advertiser making the request.

6. The method of claim 1, wherein the ad contact information includes SMS information, and tracking the effectiveness of the print ad includes tracking text messages corresponding to the SMS information.

7. The method of claim 1, wherein the ad contact information includes web search terms, and tracking the effectiveness of the print ad includes tracking increased web search queries using the web search terms.

8. The method of claim 1, wherein the ad contact information includes a barcode encoding an item of ad contact information, and tracking the effectiveness of the print ad includes tracking the effectiveness of the item of ad contact information.

9. The method of claim 1, wherein the standard form is included in a footer included in a lower portion of the print ad.

10. The method of claim 1, wherein the standard form is included in a header included in an upper portion of the print ad.

11. The method of claim 1, wherein the standard form is positioned along a side of the print ad.

12. The method of claim 1, wherein identifying the ad contact information comprises retrieving the ad contact information from a data store including previously collected ad contact information.

13. The method of claim 1 wherein the ad contact information includes a plurality of different mechanisms for obtaining information about the print ad and wherein tracking the effectiveness of the print ad includes separately tracking the effectiveness using each of the different plural mechanisms.

14. A method comprising:
performing in one or more computers operations comprising:
identifying custom ad content;
identifying ad contact information;
receiving input selecting a portion of the ad contact information to be provided within an ad including the custom ad content;
identifying a standard form for presentation of the ad contact information;
populating the standard form with the selected portion of the ad contact information;
generating an ad including combining the standard form with the custom ad content;
receiving input selecting to activate a plurality of tracking mechanisms associated with the ad, each tracking mechanism configured to track contacts with a sponsor of the ad using separate portions of the ad contact information;
providing the ad including the custom ad content and the standard form to a publisher;
tracking an effectiveness of the ad based at least in part on usage of information presented in the standard form including determining a portion of the information most often used when contacting the sponsor; and
reporting the effectiveness of the ad.

15. The method of claim 14, wherein the ad comprises an advertisement on television.

16. The method of claim 14, wherein the ad comprises an audio advertisement.

17. The method of claim 14, wherein the ad comprises an advertisement published online and available over the Internet.

18. The method of claim 14 wherein the ad contact information includes a plurality of different mechanisms for obtaining information about the print ad and wherein tracking the effectiveness of the print ad includes separately tracking the effectiveness using each of the different plural mechanisms.

19. A system comprising:
a user interface adapted to interface with a plurality of advertisers;
a unified ad contact information module configured to receive ad contact information from advertisers by way of the user interface;
an ad module configured to:
receive at least a portion of the ad contact information from the unified ad contact information module;
identify a standard form for presenting the portion;
populate the standard form with the portion;
receive ad content from advertisers by way of the user interface; and
provide an ad including combining the ad content and the standard form to one or more publishers for publication; and
a tracking module configured to:
receive a selection for a given ad of a plurality of tracking mechanisms to enable tracking contacts with a sponsoring advertiser using different portions of the ad contact information;
track the effectiveness of the ad using the portion of ad contact information including determining a portion of the ad contact information most often used when contacting the sponsoring advertiser; and
provide tracking data to advertisers.

20. The system of claim 19, wherein the portion includes a web address, and a tracking module configured to track the effectiveness of the ad comprises a tracking module configured to track web traffic to the web address.

21. The system of claim 19, wherein the portion includes a code, and a tracking module configured to track the effectiveness of the ad comprises a tracking module configured to track use of the code.

22. The system of claim 19, wherein the portion includes a telephone number, and a tracking module configured to track the effectiveness of the ad comprises a tracking module configured to track calls to the telephone number.

23. The system of claim 19, wherein the portion includes SMS information, and a tracking module configured to track the effectiveness of the ad comprises a tracking module configured to track text messages corresponding to the SMS information.

24. The system of claim 19, wherein the portion includes web search terms, and a tracking module configured to track the effectiveness of the ad comprises a tracking module configured to track increased web search queries using the web search terms.

25. The system of claim 19, wherein the portion includes a barcode encoding an item of ad contact information, and a tracking module configured to track the effectiveness of the ad comprises a tracking module configured to track the effectiveness of the item of ad contact information.

26. The system of claim 19, further comprising a data store including previously collected ad contact information, wherein identifying the portion of ad contact information comprises retrieving the portion of ad contact information from the data store.

27. The system of claim 19 wherein the portion of ad contact information includes a plurality of different mechanisms for obtaining information about the ad and wherein tracking the effectiveness of the ad includes separately tracking the effectiveness using each of the different plural mechanisms.

28. A system comprising:
means for identifying custom ad content;
means for identifying ad contact information;
means for identifying a standard form for the ad contact information;
means for populating the standard form with the identified ad contact information;
means for combining the populated standard form and the custom ad content to form a print ad for publication;
means for receiving input selecting to activate a plurality of tracking mechanisms associated with the print ad, including activating tracking means for tracking plural different portions of the ad contact information;
means for providing the print ad to a publisher;
means for tracking an effectiveness of the print ad based at least in part on use of different portions of the identified contact information; and
means for reporting the effectiveness of the print ad.

* * * * *